US008522891B2

(12) United States Patent
Heichel et al.

(10) Patent No.: US 8,522,891 B2

(45) **Date of Patent: *Sep. 3, 2013**

(54) VIBRATION GENERATOR FOR A VIBRATION PILE DRIVER

(75) Inventors: Christian Heichel, Niedernberg (DE); Albrecht Kleibl, Grosshennersdorf (DE)

(73) Assignee: ABI Anlangentechnik-Baumaschinen-Industriebedarf Maschinenfabrik und Vertriebsgesellschaft mbH, Niedernberg (DE)

(*) Notice: Subject to any disclaimer, the term of this patent is extended or adjusted under 35 U.S.C. 154(b) by 831 days.

This patent is subject to a terminal disclaimer.

(21) Appl. No.: 12/290,104

(22) Filed: Oct. 27, 2008

(65) Prior Publication Data

US 2009/0189467 A1 Jul. 30, 2009

(30) Foreign Application Priority Data

Jan. 29, 2008 (EP) .................................... 08001601

(51) Int. Cl.
*H02K 7/06* (2006.01)

(52) U.S. Cl.
USPC .......................................... 173/49; 173/162.1

(58) Field of Classification Search
USPC ........ 173/2, 49, 90, 142, 164, 162.1; 310/81, 310/76, 77, 92, 93
See application file for complete search history.

(56) References Cited

U.S. PATENT DOCUMENTS

| | | | | |
|---|---|---|---|---|
| 4,018,290 | A * | 4/1977 | Schmidt | 173/49 |
| 4,113,034 | A * | 9/1978 | Carlson | 173/49 |
| 4,211,121 | A * | 7/1980 | Brown | 74/87 |
| 4,389,137 | A * | 6/1983 | Riedl | 404/113 |
| 4,534,419 | A * | 8/1985 | Vural | 173/1 |
| 4,766,771 | A * | 8/1988 | Bailey et al. | 74/61 |
| 4,793,196 | A * | 12/1988 | Davis et al. | 74/61 |
| 4,819,740 | A * | 4/1989 | Warrington | 173/49 |
| 5,177,386 | A * | 1/1993 | Shimada | 310/81 |
| 5,375,664 | A * | 12/1994 | McDowell et al. | 173/1 |
| 5,410,879 | A * | 5/1995 | Houze | 60/469 |
| 5,911,280 | A * | 6/1999 | Bald | 173/1 |
| 6,105,685 | A | 8/2000 | Bald | |
| 6,345,546 | B1 * | 2/2002 | Houze | 74/61 |
| 6,604,583 | B1 * | 8/2003 | Van Randen | 173/49 |
| 6,769,838 | B2 * | 8/2004 | Potts | 404/117 |
| 7,404,449 | B2 * | 7/2008 | Bermingham et al. | 173/2 |
| 7,598,640 | B2 * | 10/2009 | Heichel et al. | 310/81 |
| 2007/0074881 | A1 * | 4/2007 | Bermingham et al. | 173/2 |
| 2008/0218013 | A1 * | 9/2008 | Heichel et al. | 310/81 |
| 2009/0188687 | A1 * | 7/2009 | Heichel et al. | 173/49 |

FOREIGN PATENT DOCUMENTS

| | | |
|---|---|---|
| DE | 43 01 368 | 1/1994 |
| DE | 195 43 910 | 5/1997 |
| DE | 20 2007 005 283 | 8/2007 |
| EP | 0 577 444 | 1/1994 |
| EP | 0 951 949 | 10/1999 |

* cited by examiner

*Primary Examiner* — Brian D Nash
(74) *Attorney, Agent, or Firm* — Collard & Roe, P.C.

(57) ABSTRACT

A vibration generator for a vibration pile driver, comprises imbalance masses that can rotate, which are disposed on shafts. A hydraulic drive having a changeable suction volume is disposed on the generator. A vibration pile driver consists of the vibration generator and a mast for movably supporting the vibration generator and/or an accommodation for a pile-driven material.

13 Claims, 2 Drawing Sheets

VIBRATION GENERATOR FOR A VIBRATION PILE DRIVER

CROSS REFERENCE TO RELATED APPLICATIONS

Applicants claim priority under 35 U.S.C. §119 of European Application No. 08001601 filed Jan. 29, 2008.

BACKGROUND OF THE INVENTION

1. Field of the Invention

The invention relates to a vibration generator for a vibration pile driver, that comprises imbalance masses that can rotate, which are disposed on shafts. A hydraulic drive having a changeable suction volume is disposed in the generator. The invention furthermore relates to a vibration pile driver having such a vibration generator.

2. The Prior Art

In construction, vibration generators are used to introduce objects, such as profiles, into the ground, or to draw them from the ground, or also to compact ground material. The ground is excited by vibration, and thereby achieves a “pseudo-fluid” state. The goods to be driven in can then be pressed into the construction ground by a static top load. The vibration is characterized by a linear movement and is generated by rotating imbalances that run in opposite directions, in pairs, within a vibrator gear mechanism. Vibration generators are characterized by the rotating imbalance and by the maximal speed of rotation.

Vibration generators are vibration exciters having a linear effect, whose centrifugal force is generated by rotating imbalances. These vibration exciters move at a changeable speed. The size of the imbalance is also referred to as “static moment.” The progression of the speed of the linear vibration exciter corresponds to a periodically recurring function, for example a sine function, but it can also assume other shapes.

Vibration generators are operated with hydraulic drives, which put the shafts on which the imbalances are disposed into rotation. Such hydraulic drives have a power curve that is dependent on the operating speed of rotation and on the operating pressure, respectively. At the same drive power, a higher static moment can be achieved by a lower speed of rotation, thereby bringing about a higher ground vibration, at the same time. In inner city regions, ground vibrations should be avoided. These can be reduced by operating at a higher speed of rotation, but at the same time, the static moment is reduced as a result. These measures prove to be problematic, since the required drive power and the torque are dependent on the speed of rotation. If the hydraulic drive, i.e. motor, leaves its optimal range of operational speed of rotation, this results in a pressure drop. Likewise, the required torque at the motor decreases with an increasing mass of pile-driven material. Accordingly, the pressure gradient at the motor decreases, and only partial use of the drive power that is offered is possible any longer.

SUMMARY OF THE INVENTION

It is therefore an object of the invention to provide a vibration generator that allows operation in different ranges of speed of rotation, without a drop in power.

With the invention, a vibration exciter is created that allows operation in different ranges of speed of rotation, without a drop in power. Adaptation of the power curve to the range of speed of rotation required, in each instance, is made possible by the use of a hydraulic drive having a changeable suction volume. This counteracts a drop in power of the drive.

With hydraulic motors and drives, suction volume is understood to be the amount of hydraulic fluid that the hydraulic drive consumes per revolution. The power given off by a hydraulic drive is directly proportional to the suction volume, the speed of rotation, and the pressure gradient. The product of suction volume and speed of rotation yields the volume stream. The pressure gradient is the difference between pressure of the in-flowing hydraulic fluid (which is generally the pump pressure) and the pressure of the out-flowing hydraulic fluid (which is generally the tank pressure).

In one embodiment of the invention, a control module is provided, by way of which the suction volume can be adjusted as a function of the operational pressure or speed of rotation. In this way, continuous adaptation of the power curve of the hydraulic drive is made possible, thereby allowing the vibration generator to optimally utilize the power that is offered.

In another embodiment of the invention, a limit operational pressure or a limit speed of rotation can be set. In this way, a defined operational state can be set, at which a change in the suction volume is to be initiated.

In a further embodiment of the invention, a control and regulation circuit is provided, which comprises a memory unit for storing ground composition data sets or task-specific default data sets with defined operational characteristic variables, from which a required data set can be selected; sensors for continuous detection of the defined operational characteristic variables; an evaluation unit for comparing the operational characteristic variables that are determined with the operational characteristic variables of the selected default data set; a regulation device coupled with the evaluation unit, for regulating the vibration generator; as well as a control device coupled with the regulation device, for controlling the means for adjusting the rotational position of the imbalance masses relative to one another. In this way, it is possible to make available and select empirical values acquired in practice, in the manner of an expert system. In this way, simple setting of the vibration generator can take place as a function of the set task, by selecting an operational data set to be selected on the basis of each task.

It is advantageous if the control module for setting the suction volume is integrated into the drive. Alternatively, the control module can be integrated into the control and regulation circuit.

In a further development of the invention, sensors are disposed to detect the frequency, the static top load, as well as the position of the imbalance masses relative to one another. Preferably, the sensors comprise at least one inductive sensor and/or one rotary position transducer. Such sensors have proven to be long-lasting and robust. It is advantageous if a sensor is disposed for detecting the acceleration of the rotating shafts. In addition, a sensor can be disposed for detecting the amplitude of the vibrations of the vibration generator.

In one embodiment of the invention, there is a device for automatic selection of a default data set on the basis of the acceleration values that are determined. In this way, automatic programming can be implemented, by means of which automatic selection of the most efficient default variables takes place as a function of the task-specific operational situation, without any operator intervention being required. Alternatively, a semi-automatic system can also be implemented, in which an operational characteristic variable data set is suggested to the operator, and can be confirmed or changed by the operator.

It is advantageous if the evaluation unit has a memory-programmable control (programmable logic controller PLC). In this way, flexible control of the vibration generator is possible.

In a further development of the invention, an acoustic and/or optical warning device is provided to send an alarm in case of incorrect input, and is connected with the evaluation unit. In this way, the operator can be notified that an adjustment and/or change in the current operational characteristic variables is necessary.

It is another object of the invention to provide a vibration pile driver that allows operation in different ranges of speed of rotation, without a drop in power. With the invention, a vibration pile driver is created, which allows operation in different ranges of speed of rotation, without a drop in power.

In one embodiment of the invention, a sensor is disposed for detecting the forces that act on the pile-driven material. Characterization of the ground composition is made possible by determining this variable. This characterization can be improved by the preferred placement of at least one sensor for detecting the vibrations of the penetrating medium, which can be applied to the penetrating medium, and is connected with the evaluation unit. Preferably, a sensor for detecting the penetration speed of the pile-driven material is provided.

In a preferred further embodiment of the invention, there is a device for automatic selection of a default data set on the basis of the forces that are determined and act on the pile-driven material and/or of the speed and acceleration of the pile-driven material and/or of the detected vibrations of the penetration medium. In this way, automatic programming can be implemented, by means of which automatic selection of the most efficient default variables takes place as a function of the task-specific operational situation, without any operator intervention being required. Alternatively, a semi-automatic system can also be implemented, in which an operational characteristic variable data set is suggested to the operator, and can be confirmed or changed by the operator.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
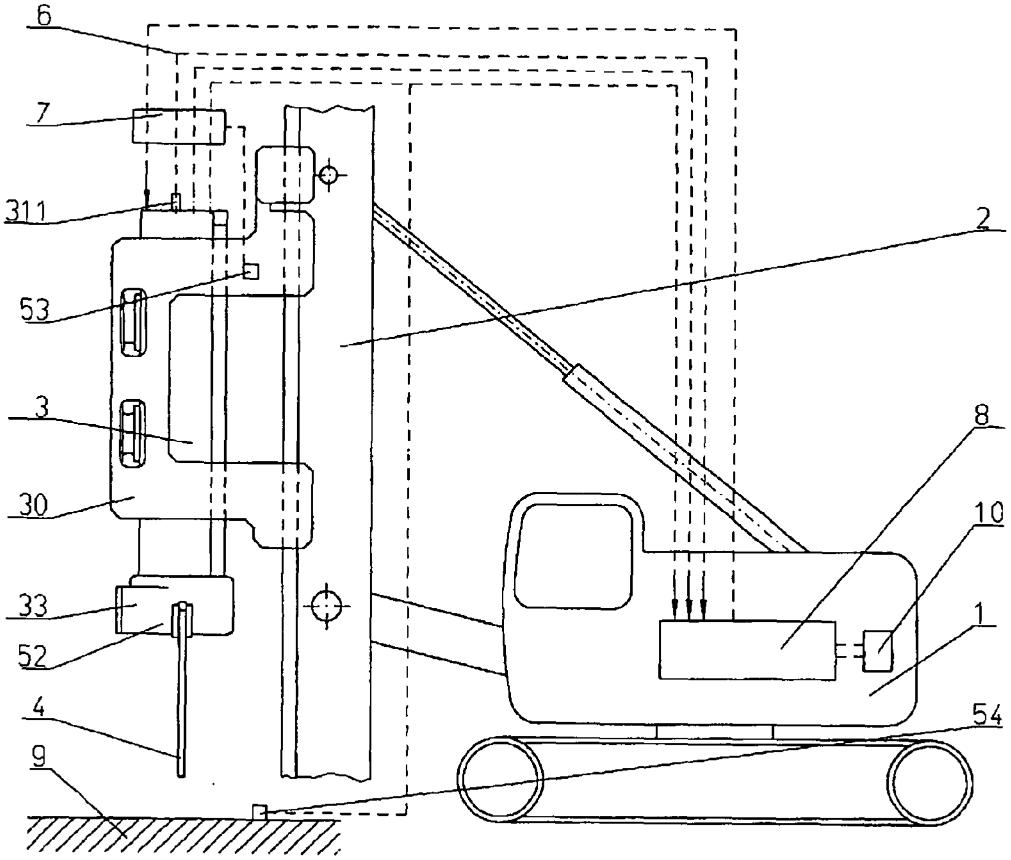
FIG. 1 shows a schematic representation of a vibration pile driver with a support device.

Referring now in detail to the drawings, the vibration pile driver selected as an exemplary embodiment consists essentially of a support device 1, on which a vibration generator (vibrator) 3 is disposed so that it can be displaced vertically, by way of a mast 2. Vibration generator 3 comprises a housing 31, which is surrounded by a hood 30. Clamping pliers 33 for accommodating pile-driven material 4 are disposed on hood 30. Hood 30 guides vibration generator 3, and transfers the static force of mast 2 to vibration generator 3. Vibration generator 3 generates a vibration, by way of rotating imbalances 3311, 3321, 3331, 3511, 3521, 3531, which vibration is transferred to pile-driven material 4, by way of clamping pliers 33.

Figure 2:
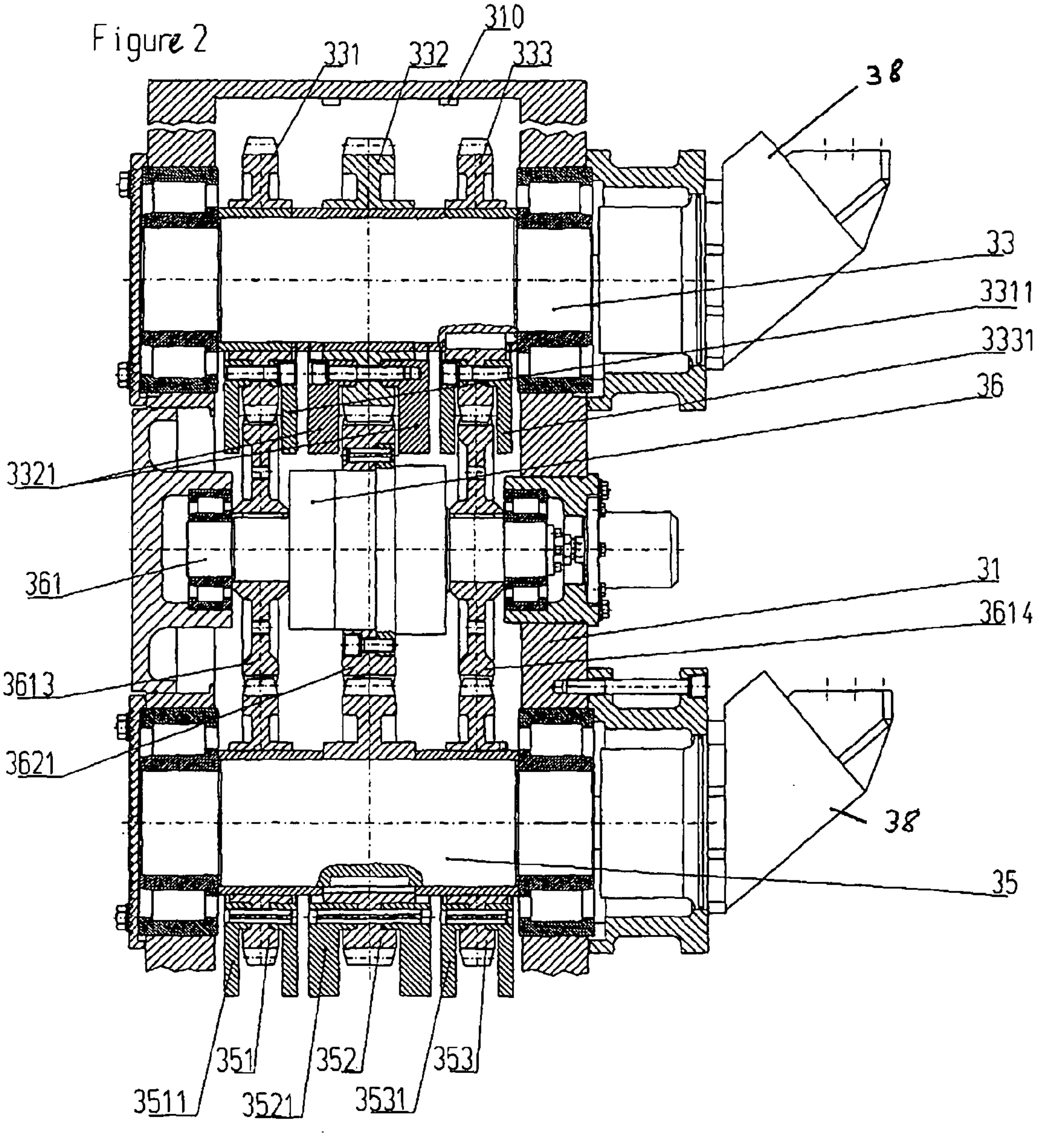
FIG. 2 shows a schematic representation of a vibrator gear mechanism in longitudinal section.

Vibration generator 3 is structured as a vibrator gear mechanism (FIG. 2). It consists essentially of a housing 31, in which shafts 33, 35 provided with gear wheels 331, 332, 333, 351, 352, 353 are mounted to rotate. Gear wheels 331, 332, 333, 351, 352, 353 are provided with imbalance masses 3311, 3321, 3331, 3511, 3521, 3531, respectively. The gear wheels of the two shafts 33, 35 are in engagement with one another by way of gear wheels 3613, 3614 of rotor shaft 361 of a pivot motor 36. Gear wheels 331, 332, 333, 351, 352, 353 provided with imbalance masses 3311, 3321, 3331, 3511, 3521, 3531 are adjustable in their rotational position, relative to one another, by way of pivot motor 36, thereby making it possible to adjust the resulting imbalance, i.e. the resulting static moment. Such vibrator gear mechanisms with imbalance masses mounted so as to rotate, which are adjustable in their relative phase position, are known to a person skilled in the art, for example from German Patent Application No. DE 20 2007 005 283 U1.

Vibration generator 3 is provided with two inductive sensors 310, disposed on the inside of housing 31, parallel to the circumference of the gear wheels, at a distance from one another, lying opposite gear wheels 331, 332, 333, 351, 352, 353. Inductive sensors 310 allow detection of the angular acceleration of rotating imbalance masses 3311, 3321, 3331, 3511, 3521, 3531. Furthermore, by way of the time offset of imbalance masses 3311, 3321, 3331, 3511, 3521, 3531, their position relative to one another can be determined. Furthermore, an acceleration sensor 311 is disposed on housing 31 of vibration generator 3. A memory-programmable control (programmable logic controller PLC) 7 is disposed as an evaluation unit for processing the signals of sensors 310, 311, and determining the aforementioned variables. Control 7 furthermore calculates the static moment that is applied, on the basis of the frequency and time offset of the imbalance masses relative to one another. Alternatively, a sensor system having two inductive sensors (in other words one inductive sensor per imbalance cycle) can also be provided, along with an acceleration sensor affixed to the housing of the vibration generator.

Shafts 33, 35 of vibration generator 3 are connected with hydraulic drives 38 that have a changeable suction volume. Such hydraulic drives, which can be regulated, are known in different embodiments. Hydraulic drives 38 are connected with a regulation module by way of which the suction volume can be set as a function of the operational speed of rotation range. In the embodiment shown, the regulation module is integrated into drive 38.

Switched ahead of the PLC 7 is a memory unit 10 that is connected with the PLC 7 by way of lines 6. Default data sets specific to the ground composition, with defined operational characteristic variables, are stored in memory unit 10. These default variables are empirically determined variables. In the embodiment shown, PLC 7, together with memory unit 10, forms an automatic programming that selects a corresponding, efficient data set on the basis of the existing ground composition. In the embodiment shown, the data sets are coupled with force and acceleration values to be determined, which are passed on to the PLC 7 as input variables. In addition, the vibration emission of the surrounding penetration medium is stored in memory as an influence variable.

The determination of the force and acceleration values takes place by way of a force sensor 52 and an acceleration sensor 311. Force sensor 52 is set up so that it determines the forces that act on the pile-driven material 4, which results from the forces applied by the mast 2 and the counter-force generated by the penetration medium, and passes them on to the PLC 7 by way of lines 6. The acceleration sensor 311 is set up in such a manner that it determines the penetration speed and acceleration of the pile-driven material 4 into the penetration medium 9, and also passes them on to the PLC 7 by way of lines 6. Optionally, the penetration speed can be determined with an additional sensor (53), preferably a laser for measuring the distance between vibrator and ground. Alternatively, the determination of the applied force can also take place by way of an acceleration sensor 311 and the dynamic mass.

To determine the vibration emission of ground 9 that surrounds pile-driven material 4, a vibration sensor 54 is affixed to ground 9 at a distance from the penetration location of pile-driven material 4. Vibration sensor 54 determines the vibrations emitted by penetration medium 9 during the pile-driving process, and passes the determined vibration values to PLC 7 by way of a line 6.

On the basis of the force and acceleration values determined in this way, as well as the measured vibration values, the default data set assigned to these values (i.e. to a value range into which the determined values fall) is selected from a memory unit 10; its default values are used for reconciliation with the operational characteristic variables determined by the sensors 310, 311. In an alternative embodiment, the selection of a data set by the operator of the vibration pile driver is also possible, by way of a corresponding control panel.

A control 8 is disposed in support device 1, and connected with the memory unit 10 and with PLC 7 by way of lines 6. Control 8 is set up in such a manner that it calculates the optimal operational characteristic variables of the vibration generator from the static moment determined by PLC 7 and the acceleration data determined by sensors 311, against the background of the default characteristic values of the default data set selected from memory unit 10.

Control 8 is connected with pivot motor 36 for changing the position of rotation of the imbalance masses relative to one another, which motor is disposed in vibration generator 3. Reconciliation of the actual operational characteristic data detected by sensors 310, 311 with the corresponding default values of the selected default data set takes place by way of control of pivot motor 36. If the permissible acceleration values are exceeded, re-adjustment of the resulting imbalance, i.e. of the resulting static moment, takes place by way of pivot motor 36 with gear wheel 3621.

In addition, the installation of an optical and/or acoustical signal in the operator's cabin of the support device is possible, in order to inform the operator of the fact that permissible acceleration values have been significantly exceeded. In a normal case, this points out that an unsuitable operational characteristic variable set has been selected from the memory unit 10. By activation of the signal, the operator is instructed to review the selection of the default data set and to correct it, if necessary.

Accordingly, while only a few embodiments of the present invention have been shown and described, it is obvious that many changes and modifications may be made thereunto without departing from the spirit and scope of the invention.

What is claimed is:

1. A vibration generator for a vibration pile driver, comprising:

rotatable imbalance masses disposed on shafts; and at least one hydraulic drive having a changeable suction volume;

wherein the suction volume is changed based on a change in a speed of rotation of the drive, without a change in power given off by the drive, and wherein the power is a function of the suction volume, speed of rotation of the drive and operational pressure of the drive.

2. The vibration generator according to claim 1, further comprising means for adjusting a rotation position of the imbalance masses, relative to one another.

3. The vibration generator according to claim 2, further comprising a control and regulation circuit having the following components:

a memory unit for storing ground composition data sets or task-specific default data sets with defined operational characteristic variables, from which a required data set can be selected;

sensors for continuous detection of defined operational characteristic variables;

an evaluation unit for comparing the detected operational characteristic variables with operational characteristic variables of a selected default data set;

a regulation device coupled with the evaluation unit for regulating the vibration generator; and a control device coupled with the regulation device, for controlling the means for adjusting the rotational position of the imbalance masses relative to one another.

4. The vibration generator according to claim 1, further comprising a control module that sets the suction volume as a function of an operational pressure or speed of rotation.

5. The vibration generator according to claim 4, wherein the control module is adapted to set a limit operational pressure or a limit speed of rotation.

6. The vibration generator according to claim 1, further comprising sensors for detecting a frequency as well as a position of the imbalance masses relative to one another.

7. The vibration generator according to claim 1, further comprising at least one sensor for detecting acceleration of at least one of the shafts, said at least one sensor being disposed within the vibration generator.

8. The vibration generator according to claim 1, further comprising at least one sensor for detecting acceleration of the vibration generator.

9. The vibration generator according to claim 8, further comprising a device for automatic selection of a default data set on the basis of determined acceleration values.

10. A vibration pile driver, comprising:

a vibration generator according to claim 1; and at least one of a mast for movably supporting the vibration generator, and an accommodation for a pile-driven material.

11. The vibration pile driver according to claim 10, further comprising a sensor for detecting a force that acts on the pile-driven material.

12. The vibration pile driver according to claim 10, further comprising a sensor for detecting penetration speed.

13. The vibration pile driver according to claim 10, further comprising at least one external sensor which can be applied to penetration medium, for detecting vibrations of the penetration medium, said sensor being connected with an evaluation unit.

* * * * *